United States Patent [19]

Yrjönen et al.

[11] 4,348,588

[45] Sep. 7, 1982

[54] METHOD FOR COMPENSATING MEASURING VALUES WHEN MEASURING THE RADIATION FROM A NUMBER OF RADIOACTIVE SAMPLES IN AN AUTOMATIC RADIATION DETECTING INSTRUMENT

[75] Inventors: Tapio Yrjönen; Urpo Pietilä, both of Turku; Tim Rawlins, Yliskulma, all of Finland

[73] Assignee: Wallac Oy, Turku, Finland

[21] Appl. No.: 86,513

[22] Filed: Oct. 19, 1979

[51] Int. Cl.³ .................. G01D 18/00; G01T 1/00; G01T 1/20

[52] U.S. Cl. .................. 250/252.1; 250/328; 250/366

[58] Field of Search .............. 250/252, 328, 394, 366, 250/367, 369, 364

[56] References Cited

U.S. PATENT DOCUMENTS 2,829,269  4/1958  Peacock et al. .................. 250/369
3,246,150  4/1966  Stoddart et al. .................. 250/328
3,923,463  12/1975  Bagshawe et al. .................. 250/328
4,005,292  1/1977  Oesterlin et al. .................. 250/328

Primary Examiner—Alfred E. Smith
Assistant Examiner—Carolyn E. Fields
Attorney, Agent, or Firm—Fisher, Christen & Sabol

[57] ABSTRACT

A system for the measurement of radioactivity of a number of radioactive samples by a radiation detector which will be affected by radiation from a number of other sources having predetermined locations in addition to the sample being measured consists of first measuring the values of activity measured by the detector when a standard radiation source of known activity is placed in the detector and in each of the predetermined locations to determine the effect of the other sources on the measurements of the detector, storing the values thus determined and thereafter compensating the values of radioactivity of each sample measured by the detector with the stored values to obtain the actual values of radioactivity of the samples.

3 Claims, 3 Drawing Figures

COUNTING RACK IN THE PRESENCE OF
INTERFERRING RADIATION

FIG. 1 ARROWS REPRESENT THE COUNT RATE FOR RADIATION FROM THE SAMPLE IN EACH DETECTOR. THE PARTICULAR ANGLES SHOWN FOR THE ARROWS REPRESENT THE EXAMPLE OF RADIATION Y(1) MEASURED FOR DETECTOR ONE.

COUNTING RACK IN THE PRESENCE OF
INTERFERRING RADIATION

METHOD FOR COMPENSATING MEASURING VALUES WHEN MEASURING THE RADIATION FROM A NUMBER OF RADIOACTIVE SAMPLES IN AN AUTOMATIC RADIATION DETECTING INSTRUMENT

The present invention refers to a method for compensating the measuring values when measuring the radiation from a number of radioactive samples in a radiation measuring instrument where the radiation detector in addition to the radiation from the sample is affected by radiation from a number of other sources of radiation which during the measurement have certain determined positions in relation to the detector. In automatic nuclear instruments, such as beta- and gamma-counters, one of two methods are usually used for preventing disturbing radiation deriving from other sources of radiation than the sample to affect the measuring value. The first method used for reducing the amount of such interfering radiation is to shield the detector and the sample to be measured with large amounts of a strongly absorbing material such as lead. This has the effect of absorbing a proportion of the radiation before it can be detected and thereby reducing the amount of interfering radiation. The amount of shielding required is highly dependent on the energy of the emitted radiation: for low energies the amount absorbed for a given thickness is large, but to absorb the same amount at high energies requires a much greater amount. These relationships are well known to those skilled in the art. The second alternative method which is often used in combination with the first, is to ensure that the detector is at some distance from sources of interfering radiation (such sources often comprise for example other samples waiting to be counted) thereby reducing the amount of interfering radiation absorbed in the detector. In conventional nuclear counters used in medicine and biology, it is often the case that large numbers of samples have to be counted, when this is so and a single shielded detector is employed, samples that have been counted and those waiting to be counted, must be kept as far away as possible from the detector in order to reduce the amount of interfering radiation.

In order to count large numbers of samples rapidly some conventional counters have employed several detectors which have to be close together. This method has been limited in application to low energy radiation because when the detectors are close together it is not possible to have sufficient shielding to prevent samples in one detector from causing interfering radiation in another detector.

It is an object of the present invention to provide a method in automatic nuclear radiation measuring where the influence of disturbing radiation is reduced without requiring extensive quantities of shielding materials and without requiring a big distance between the detector and the sources of disturbing radiation.

The characteristics of the invention will appear from the claims attached to the specification.

FIG. 1 shows plural detectors for measuring radiation from plural sources in accordance with this invention.

An embodiment of the invention will now be described in terms of an example of the method according to the invention.

Figure 2:
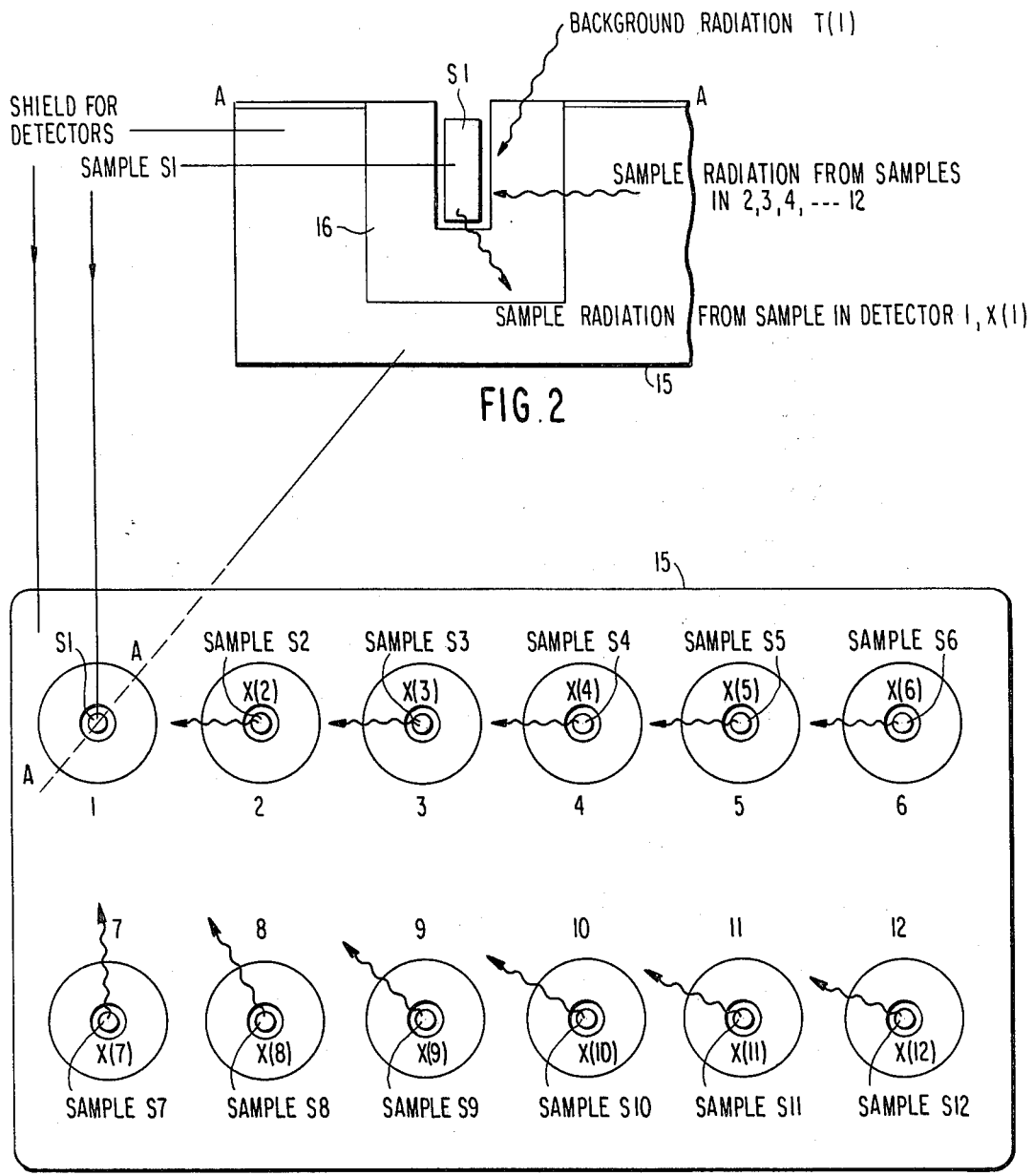
FIG. 2 is a vertical cross-section on line A—A of FIG. 1 on an enlarged scale.

According to the embodiment shown in FIGS. 1 and 2 it is suggested to have a number of detectors for instance arranged in two rows as indicated generally by numerals 1, 2, 3, 4 ... 12 with six detectors in each row which permits a simultaneous measuring of twelve samples S1, S2, S3, S4 ... S12. The radiation measured by any one detector 16 is the sum of the radiation detected at that detector for the sample that it contains, plus the interfering radiation from samples in all the other detectors, plus the background radiation measured at that detector.

This sum may be expressed mathematically as follows: considering detector one (see FIGS. 1 and 2)

$$Y(1) = T(1) + E(1)\,(X(1) + A(1,2)X(2) + A(1,3)X(3) + \ldots + A(1,N)X(N) + \ldots + A(1,12)X(12))$$

where $Y(1)$ is the total count rate from detector one.
$T(1)$ is the background count rate from detector one.
$E(1)$ is the efficiency of detection for the sample in detector one.
$X(N)$ is the true rate for the sample in detector N
$A(1,N)$ is the relative detection efficiency in detector one for the sample in detector N
$N = 1-12$ The equations for all twelve detectors may be summarised by the matrix equation $$[Y] = [T] + [E][A][X]$$

whereby a measuring is first carried out to define the elements of the matrix T and thereafter twelve measurements are performed to define the elements in the matrices E and A.

A sample is placed in the first detector 16 at location 1, and the apparatus makes a measurement is made by the counter 18 of the amount of radiation detected in this detector and the amount of interfering radiation in all of the other detectors at locations 2 through 12. All these amounts of radiation are stored in the memory of the apparatus. The sample is then moved to the next detector at location 2 and the amount of radiation detected in the detector containing the sample is registered as well as the amount of radiation in all of the other detectors, all of these amounts of radiation are also stored in the memory of the apparatus. This process is repeated until the same has been measured in all twelve detectors, the memory of the apparatus then contains twelve sets of twelve measured amounts of radiation for the sample concerned. This process must be repeated whenever a sample labelled with a different isotope is to be measured. After storage of this data, the apparatus performs a calculation to determine the fraction of radiation registered in one detector when the sample is in some other detector. Mathematically this may be expressed as an inversion of the matrices A and E. When this calculation has been completed and the values stored, the apparatus measures samples waiting to be counted and uses the stored fractions in the memory to correct the measured amount of radiation in each detector for the effect of interfering radiation from samples in other detectors. A final result is then provided which is substantially free of the effects of interfering radiation. In this embodiment of the invention it is possible to reduce substantially the amount of detector shielding 15 required around individual detectors and still to be able to count high energy radiation.

Figure 3:
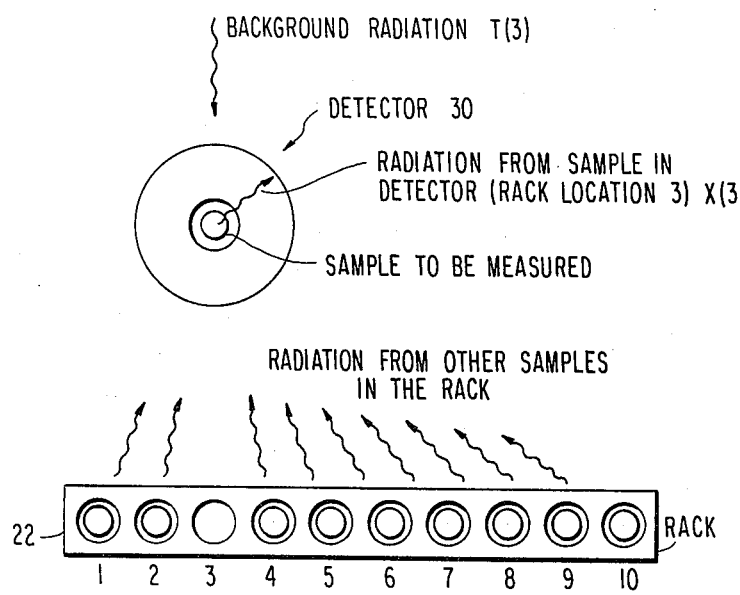
FIG. 3 shows an embodiment for measuring radiation from a rack of sources using a single detector.

In other embodiments of the invention it is possible to use the method and apparatus in a single detector instrument indicated generally at 30 to reduce the amount of detector shielding when for example racks 20 of samples S1, S2, S3 and S4 . . . S10 are counted as shown in FIG. 3. In this instance it is possible to measure the fraction of interfering radiation by counting a single sample in all of the positions in the rack and by measuring the amount of interfering radiation registered when an empty sample is counted from the other positions in the rack. The fractions from radiation from samples not being counted can then be stored and used to correct the measured amount of radiation in each sample for interfering radiation from other samples. This embodiment of the invention also allows the distance of interfering samples from the detector to be reduced.

Yet another embodiment of the invention makes it possible to use the method to correct the detection efficiency of individual detectors in instruments which use several detectors for measuring amounts of radiation so that they are all equivalent. In this instance the radiation registered by each detector with a known sample in the detector and no samples in the remaining detectors, is registered and stored, i.e. the term E (1) is determined.

Another embodiment of the invention makes it possible to use the method of the invention for measuring samples labelled with several different isotopes and then to determine the true count rate for each individual isotope label.

We claim:

1. Method for correction of measuring values when measuring the radiation from a number of radioactive samples in a radiation measuring instrument where a radiation detector in addition to the radiation from sample is affected by the radiation from a number of other sources of radiation which during the measurement have predetermined locations in respect to the detector, characterized in that first the degree of affection in the detector from the radiation of the sample and from sources in said locations is determined by means of locating a known radiation source of known activity in each of said locations and determining and storing the measuring values thus obtained, whereafter the measuring value for each sample is compensated for by considering the measuring value from the other sources and said degree of affection.

2. Method according to claim 1, characterized in that all samples are measured simultaneously by a detector located in each of said locations.

3. Method according to claim 1, characterized in that the samples are measured subsequently by one detector whereby when one sample is measured remaining samples are located in said predetermined locations.

* * * * *

UNITED STATES PATENT OFFICE
CERTIFICATE OF CORRECTION

Patent No. 4,348,588    Dated September 7, 1982

Inventor(s) Tapio Yrjönen et al.

It is certified that error appears in the above-identified patent and that said Letters Patent are hereby corrected as shown below:

On the face of the patent, please enter the following:

--(30) Foreign Application Priority Data

November 22, 1978 Sweden ....... 7812021 --.

*Signed and Sealed this*

*Twenty-sixth* Day of *October 1982*

[SEAL]

Attest:

GERALD J. MOSSINGHOFF

*Attesting Officer*    *Commissioner of Patents and Trademarks*